UNITED STATES PATENT OFFICE.

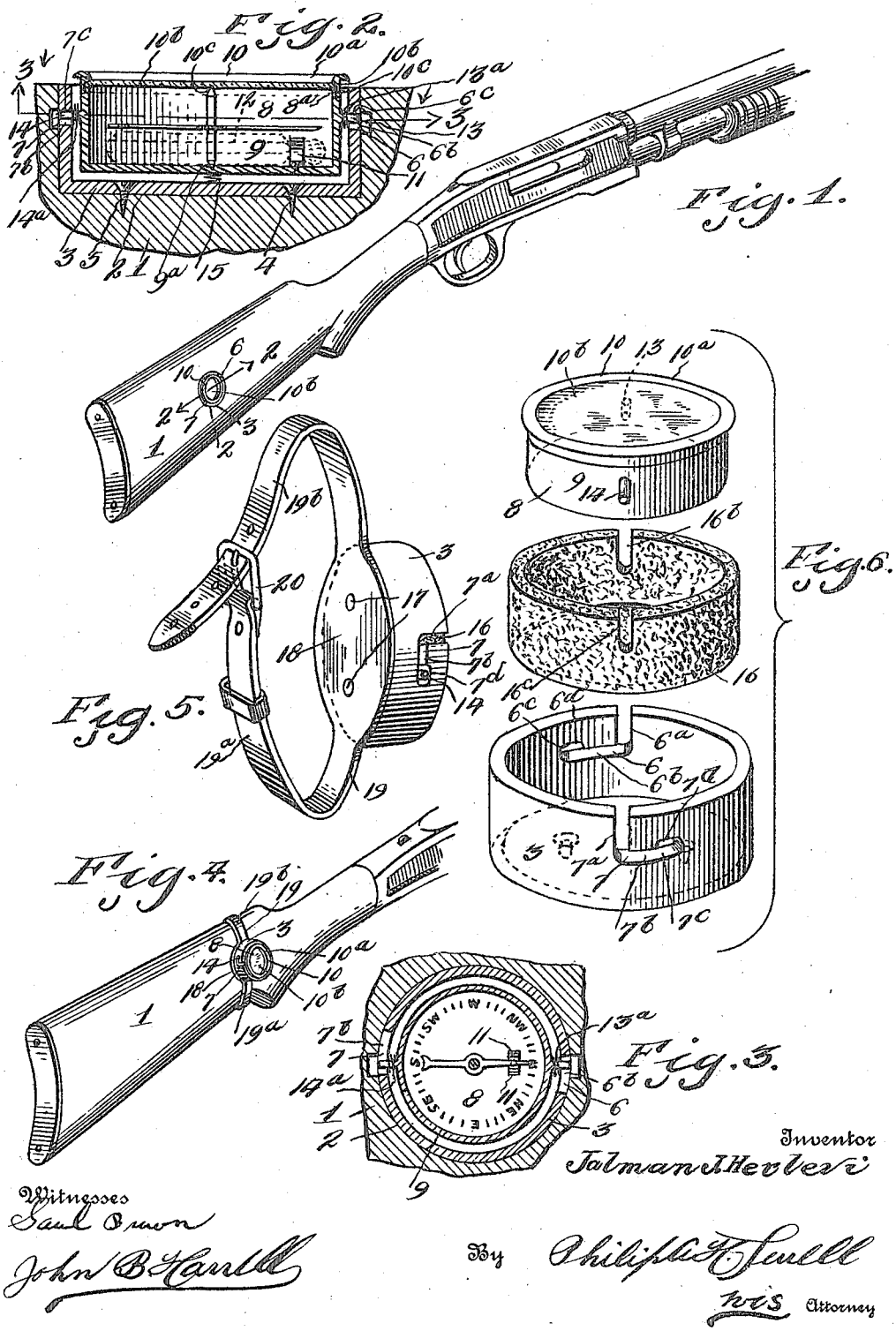

JALMAN J. HERLEVI, OF IRON BELT, WISCONSIN.

COMPASS-MOUNTING FOR GUNS AND OTHER ARTICLES.

1,187,733.  Specification of Letters Patent.  Patented June 20, 1916.

Application filed January 5, 1916. Serial No. 70,462.

*To all whom it may concern:*

Be it known that I, JALMAN J. HERLEVI, a citizen of the United States, residing at Iron Belt, in the county of Iron and State of Wisconsin, have invented certain new and useful Improvements in Compass-Mountings for Guns and other Articles, of which the following is a specification.

This invention relates to a new and useful mounting for compasses and other delicate instruments.

The primary object of this invention is to provide an efficient and practical means for mounting a compass or other delicate instruments upon the stock of a gun or upon any other object wherein a sudden shock, recoil, or sudden jar is inherent.

A further object of the invention is to provide means whereby the shock or jar to an instrument incident to the sudden recoil of a gun, or the vibration of the instrument support will be taken up in such a way that the said shock will not cause damage to the instrument.

The invention comprises further features and combination of parts, as hereinafter set forth, shown in the drawings and claimed.

In the drawings:—Figure 1 is a perspective view of the device attached to a gun; Fig. 2 is a sectional view through the device on the line 2—2 of Fig. 1; Fig. 3 is a transverse sectional view on line 3—3 of Fig. 2; Fig. 4 is a perspective view of another form of the invention in which the springs have been eliminated, and a resilient cup-shaped member used in lieu of the springs; Fig. 5 is a perspective view of the device as shown in Fig. 4, showing another means of attaching the mounting; and Fig. 6 is a collective perspective view of the mounting as shown in Figs. 4 and 5.

Referring more especially to the drawings, 1 designates the stock of a gun or other movable article to which the device may be applied, 2 a cylindrical recess, which is adapted to receive the main casing 3, which is secured in said cylindrical recess 2 by means of the screws 4 and 5. The main casing 3 is provided with bayonet slots at diametrically opposite points, the purpose of which will presently appear, said slots being designated by the numerals 6 and 7.

The instrument casing 8 (in which any suitable instrument may be placed) is cylindrical in contour and consists of two sections 9 and 10. The section 9 is provided with a bearing $9^a$ in case a compass is used. It is also provided with spring clips 11 upon its interior said clips being adapted to hold any form or kind of instrument such for instance as a watch 12, which is shown in dotted lines in Fig. 2. The upper section 10, which forms the top of the instrument casing 8 consists of an annular ring $10^a$ having a depending flange $10^b$ which flange is provided with interior threads $10^c$ adapted to receive the exterior threads $8^a$ upon the exterior of the instrument casing 8. The ring $10^a$ is also provided with a glass closure so that the instrument carried in the instrument casing 8 may at all times be consulted and readily seen without removing the top section 10, said glass closure being designated by the numeral $10^b$. The lower surface of the glass closure $10^b$ is provided with a centrally located bearing to receive the upper bearing point of a compass needle when a compass is placed in the instrument casing. Arranged upon the exterior of the compass casing at diametrically opposite points are lugs 13 and 14, which lugs are adapted to be received by the bayonet slots 6 and 7 in the main casing 3; each of these lugs 13 and 14 are provided with coil springs $13^a$ and $14^a$ adapted to bear against the outside of the instrument casing 8 and against the inside surface of the cylindrical casing 3, said springs being so tensioned that they will retain the compass casing 8 normally in central position of the main casing 3. Soldered or otherwise secured to the bottom of the casing 3 is a coil spring 15, which spring exerts an upward pressure upon the bottom of the instrument casing 8, the purpose of which will presently appear.

To insert the instrument casing 8, the lugs carrying the springs $13^a$ and $14^a$ are so positioned that they register with the vertical slots $6^a$ and $7^a$ of the bayonet slots 6 and 7, then the instrument casing is forced downward against the action of the coil spring 15 until the lugs 13 and 14 are in registration with the lateral slots $6^b$ and $7^b$, of the bayonet slots, at which time a revoluble movement is imparted to the instrument casing 8 which movement will continue until the lugs 13 and 14 have reached the enlarged portions $6^c$ and $7^c$ of the bayonet slots at which time the pressure is released from the instrument casing 8 said instrument casing being allowed to be forced upwardly by the spring 15 thereby engaging the lugs 13 and 14 with the upper surfaces 6ᵈ and 7ᵈ of the enlarged portions 6ᶜ and 7ᶜ of the bayonet slots. From this it will be seen that the instrument casing 8 is resiliently spaced from the main casing 3 thereby taking up the recoil or jolt of the article upon which the mounting is placed.

Referring to Figs. 4, 5 and 6 it will be seen that instead of the spring 13ᵃ, 14ᵃ and 15 a cylindrical shaped resilient cup member 16 is provided, which may be made of soft rubber, felt or any other suitable material; this cup member is provided with diametrically arranged vertical slots 16ᵇ and 16ᶜ, which are adapted to register with the vertical slots 6ᵃ and 7ᵃ forming parts of the bayonet slots 6 and 7. It will be noted that in this form the instrument casing 8 is completely surrounded by a resilient substance. The method of assembling this form is substantially the same as in the case of the form shown in Figs. 1, 2 and 3, except that, the cup member 16 is first inserted in the cylindrical casing 3, in such a manner that the slots 16ᵇ and 16ᶜ will register with the vertical slots 6ᵃ and 7ᵃ of the main casing 3, after which the instrument casing 8 is inserted within the cup member 16 in such a position that the lugs 13 and 14 will be received by the slots of the cup member 16 and main casing 3, after which a downward pressure is exerted upon the instrument casing 8 thereby compressing the bottom of the resilient cup member 16. After it reaches this position a partial revoluble movement is imparted which movement will continue until the lugs 13 and 14 have reached the enlargements 6ᶜ and 7ᶜ of the bayonet slots 6 and 7, after which the pressure upon the instrument casing is released thereby allowing the lugs 13 and 14, carried by the instrument casing to engage the top surfaces of the enlargements 6ᶜ and 7ᶜ of the bayonet slots, this upward movement being under the influence of the resiliency of the bottom of the resilient cup 16. It will be observed in both forms of the invention, that when the lugs are in the upper part of the enlargements 6ᶜ and 7ᶜ it will be impossible for the instrument casing to revolve to any extent without a downward pressure being applied to it. It is also to be observed that lugs 13 and 14 are so constructed that they will be long enough to engage the bayonet slots but not long enough to engage the sides of the cylindrical recess 2. In this manner the instrument casing will be allowed to move free of the main casing and against the action of the springs or as in Figs. 4, 5 and 6 against the resiliency of the cup member.

In Figs. 4 and 5 it will be seen that instead of the mounting being secured in a recess as shown in Figs. 1, 2 and 3 the main casing is riveted as at 17 to the enlarged portion 18 of a strap 19 said strap being provided with extensions 19ᵃ and 19ᵇ, the extension 19ᵃ being provided with a buckle 20 adapted to receive the portion 19ᵇ of the strap thereby forming means for attaching the mounting to a gun stock or other article without recessing the same.

The invention having been set forth, what is claimed as new and useful is:—

1. An instrument mounting comprising a main casing having diametrically opposite bayonet slots, an auxiliary casing having diametrically opposite lugs engaging said diametrically opposite bayonet slots, said slots having means to prevent retrograde movement of the auxiliary casing, and spring means whereby the auxiliary casing is retained normally in a central position of the main casing.

2. An instrument mounting comprising a main casing, an auxiliary casing having diametrically opposite lugs engaging diametrically opposite bayonet slots in the main casing, said slots having means to prevent retrograde movement of the auxiliary casing and resilient means whereby the auxiliary casing is retained normally in a central position of the main casing.

In testimony whereof I affix my signature in the presence of two witnesses.

JALMAN J. HERLEVI.

Witnesses:
OSCAR LAOJALA,
WILLIAM KALLIO.

Copies of this patent may be obtained for five cents each, by addressing the "Commissioner of Patents, Washington, D. C."